(12) United States Patent
Braid et al.

(10) Patent No.: US 12,340,497 B1
(45) Date of Patent: Jun. 24, 2025

(54) SYSTEMS, METHODS AND TOOLS FOR ESTIMATING PV MODULE AND ARRAY POWER LOSS ATTRIBUTABLE TO PARTIAL SHADING OR SOILING OF A PV MODULE AND ARRAY

(71) Applicant: National Technology & Engineering Solutions of Sandia, LLC, Albuquerque, NM (US)

(72) Inventors: Jennifer L. Braid, Albuquerque, NM (US); Laurie Burnham, Fairlee, VT (US); Daniel Riley, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 448 days.

(21) Appl. No.: 17/839,046

(22) Filed: Jun. 13, 2022

Related U.S. Application Data

(60) Provisional application No. 63/209,447, filed on Jun. 11, 2021.

(51) Int. Cl.
| | | |
|---|---|---|
| *G06T 7/00* | (2017.01) | |
| *G06T 7/11* | (2017.01) | |
| *G06T 7/13* | (2017.01) | |
| *G06T 7/70* | (2017.01) | |
| *H02S 50/10* | (2014.01) | |

(52) U.S. Cl.
CPC .............. *G06T 7/0004* (2013.01); *G06T 7/11* (2017.01); *G06T 7/13* (2017.01); *G06T 7/70* (2017.01); *G06T 2207/10024* (2013.01); *G06T 2207/30108* (2013.01); *H02S 50/10* (2014.12)

(58) Field of Classification Search
CPC . G06T 7/0004; G06T 7/11; G06T 7/13; G06T 7/70; G06T 2207/10024; G06T 2207/30108; H02S 50/10
See application file for complete search history.

(56) References Cited

U.S. PATENT DOCUMENTS

| | | | | |
|---|---|---|---|---|
| 2015/0346123 | A1* | 12/2015 | Hoffmann | G01R 21/00 324/71.1 |
| 2016/0036376 | A1* | 2/2016 | Kirchner | H02S 50/10 136/244 |
| 2017/0104451 | A1* | 4/2017 | Gostein | H02S 50/10 |

(Continued)

*Primary Examiner* — Christopher M Brandt
(74) *Attorney, Agent, or Firm* — Daniel J. Jenkins (57) ABSTRACT

Arrays of photovoltaic modules produce power as a result of incident solar radiation. The amount of radiation reaching a solar cell can be decreased due to light-blocking matter adhering to the module surface. The light-blocking or soiling matter can be snow, dirt, or other particulates such as pollen or excrement, and can be detected on the module surface using visible light photography. We have developed an automated image processing routine to estimate the power loss on a photovoltaic array due to partial surface shading, soiling or coverage from time-series visible light photographs. This tool can inform the design of PV systems optimized for particular operating environments, resulting in more efficient PV systems, can be used to inform the development of new technologies, such as anti-soiling coatings, and can help validate the accuracy of PV performance models in locations that see high rates of soiling.

32 Claims, 2 Drawing Sheets

(56) References Cited

U.S. PATENT DOCUMENTS

2023/0042106 A1\* 2/2023 Barraza Vicencio ..... G06T 7/90
2023/0268882 A1\* 8/2023 Gostein .................. H02S 50/10
324/761.01

\* cited by examiner

SYSTEMS, METHODS AND TOOLS FOR ESTIMATING PV MODULE AND ARRAY POWER LOSS ATTRIBUTABLE TO PARTIAL SHADING OR SOILING OF A PV MODULE AND ARRAY

CROSS REFERENCE TO RELATED APPLICATIONS

This application claims priority to, and the benefit of, U.S. Provisional Patent Application Ser. No. 63/209,447, filed Jun. 11, 2021, entitled "Systems, Methods and Tools for Estimating Photovoltaic Array Power Loss Attributable to Partial Shading or Soiling," the content of which is incorporated in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD

The present disclosure is generally directed to image processing, and more particularly to processing photovoltaic panel surface images to determine power loss when a module surface is partially soiled or shaded by a physical substance such as snow, dirt or sand or by a distant object that partially blocks solar irradiance upon the module surface.

BACKGROUND

Modeling and predicting power loss on photovoltaic arrays from light-blocking materials such as snow and dust is important to economic calculations, load management and system optimization for all scales of photovoltaic (PV) power plants. Previously published methods for power loss estimation are based on the percent coverage of a module or array, and do not account for the physical distribution of light-blocking material across a module's surface. The accumulation of light-blocking materials such as snow and dust on the front surface of photovoltaic (PV) modules is a recognized but poorly understood contributor to lifetime PV performance and reliability.

With the growth of solar in regions of the world that see persistent soiling in the form of snow in winter or dirt accumulation in desert regions, investors and asset owners are increasingly concerned about the impact of light-blocking materials on lifetime rates-of-return and are asking the research community for better performance data and predictive models. Such concerns appear justified, as published estimates of energy losses from snow-shading of PV modules are as high as 100% over the course of a single month and up to 10% averaged annually. These snow-related losses can determine the economic viability of a solar PV project. For example, the 4.25% energy loss due to snow expected on an 8 MW solar farm in Ontario could result in annual loss of $140,000 in solar electric revenue. Large energy losses have also been observed for PV systems in desert climates, where dust accumulation on the front surface of PV modules blocks light transmission and reduced power generation.

These estimates, however, are largely based on small systems and have not been fully modeled. In addition, previous estimates have not considered system design and other architectural parameters as contributors to the accumulation of light-blocking material (LBM) on a module's surface.

What is needed are systems, methods, and tools that can accurately determine PV panel surface obstruction such as light-blocking materials accumulated on the PV panel surface and that provide an operator with data such as estimated power loss associated with this surface obstruction, to inform corrective actions that overcomes the deficiencies of the prior art.

SUMMARY OF THE DISCLOSURE

The present disclosure is directed to methods for detecting and quantifying light-blocking material (LBM) or partial shading on one or more photovoltaic (PV) modules and determining a corresponding loss of module power, including the following steps:
Step 1: Create Time-Series of Images for Each Module;
Step 2: Map LBM or Shading Coverage on Each Module Image;
Step 3: Model Power Output;
Step 4: Quantify Power Loss; and
Step 5: Use Quantified Power Loss to determine one or more module or array physical or operational parameters.

The present disclosure is further directed to systems for detecting and quantifying light-blocking material (LBM) or shading on one or more photovoltaic (PV) modules and determining a corresponding loss of module power, including:
the one or more PV modules having a surface that received solar irradiance;
a camera for imaging the surface to create surface images;
a computer that receives the surface images and that is configured to execute commands stored on a non-transitory medium, the commands comprising the following steps:
Step 1: Create Time-Series of the Images for Each Module of the One or More Modules;
Step 2: Map LBM Coverage on Each Module Image;
Step 3: Model Power Output;
Step 4: Quantify Power Loss; and
Step 5: Use Quantified Power Loss to determine the influence of one or more module or array physical or operational parameters on module or array performance under partial shading, soiling, or other coverage.

An advantage of the present disclosure is to provide power-loss calculations attributable to soiling and partial shading.

Another advantage of the present disclosure is a more accurate approach to power-loss estimation by taking into account the distribution of soiling materials or shadowing and the module's electrical circuitry.

Another advantage of the present disclosure is to provide a tool to better understand the effect of the accumulation of light-blocking materials such as snow and dust on the front surface of photovoltaic (PV) modules as a contributor to lifetime PV performance and reliability.

Another advantage of the present disclosure is to provide for allowing light-blocking by soiling and shading by an object during the design of a PV power plant by determining shading/soiling factors for specific geographic areas and times of the year therefore providing for the deployment of higher efficiency systems.

Yet another advantage of the present disclosure is that the systems and methods provide PV asset owners with the data they need to make decisions about when or how to clean their panels of either snow or dirt; and also to evaluate the cost and efficacy of alternative strategies, such as anti-soiling coatings.

BRIEF DESCRIPTION OF THE DRAWINGS

Wherever possible, the same reference numbers will be used throughout the drawings to represent the same parts.

DETAILED DESCRIPTION

The present disclosure is directed to systems, methods and tools to estimate the power loss of a PV module or PV array due to the physical distribution and percentage coverage of light-blocking material or shading. An array may be two or more modules. The percent coverage of the module can be quantified from the physical distribution. It is the geometry of the coverage that is important for the amount of power loss due to the internal circuitry of the module. The light blocking material may be upon the surface of the module and/or may result from shading by an external object. Light blocking includes deposition on the module surface by opaque material, by material that partially blocks the sun's irradiance and by shading of objects external to the array such as trees and buildings. Extraction and characterization of the partial soiling of individual cell substrings within modules as opposed to module-level or array-level percent-coverage analysis, is important for power loss evaluation because the power production of a soiled array is affected by the array's electrical design and is not solely related to the absolute percent coverage. The series connections of cells and modules, as well as the bypass diodes within a module, mean that power production corresponds to the specific spatial distribution of light-blocking material on a module, and not solely to the overall percent coverage on an array. Previous published methods have estimated power loss based solely on the percent coverage of a module or array, not accounting for the physical distribution of light-blocking material. The term "light-blocking material" as used herein refers to a physical substance upon the surface of a PV module. Analyzing the individual modules in the array and cell strings in the module allows for a more accurate estimation of the array current, power, and energy yield. These new systems, methods and tools take into account the uneven distribution of particulate matter on the module surface and, in doing so, results in more accurate power-loss estimations.

The present disclosure is further directed to systems, methods and tools that address the physical and meteorological contributors to light-blocking material shedding as well as the overall performance and reliability of PV systems affected by such materials. In an embodiment, the light-blocking material may include snow, ice, dirt, dust, sand, pollen, bird excrement and/or airborne particulates of any kind, including fire ash, that settle on the surface of a PV module.

According to an embodiment, the systems, methods and tools detect, quantify, and predict the energy yield of fielded PV systems by modeling based on time-series images of PV systems affected by light-blocking material and the distribution of light-blocking matter across a module. The methods represent an important tool for quantitatively characterizing the performance of PV systems that experience heavy soiling as well as for evaluating cleaning technologies, design choices and other energy loss mitigation strategies for commercial and utility scale PV installations.

According to another embodiment, the systems, methods and tools detect, quantify, and analyze light-blocking material shedding rates as well as predict the energy yield of fielded PV systems by modeling based on time-series images of PV systems affected by light-blocking material and the percentage of a module covered. In an embodiment, this method represents an important tool for quantitatively characterizing the performance of PV systems that experience heavy soiling as well as for evaluating cleaning technologies, design choices and other energy loss mitigation strategies for commercial and utility scale PV installations.

According to yet another embodiment of the disclosure, a methodology for the automated analysis of module-level images that allows for detailed analysis of module soiling and power production as a function of module position within the array is disclosed. The disclosed method herein includes taking time-series images of a PV module that can then be analyzed to distinguish light-blocking matter from the unsoiled module surface, thus directly capturing the interaction of soiling with the modules' electrical architecture.

According to yet another embodiment of the disclosure, methods are disclosed for measuring snow shedding from fielded modules and also describes the application of this method to a commercial-scale PV power plant with two subsystems, one with modules in portrait orientation and the other in landscape. The method relies on time-series images taken at pre-set intervals to capture the dynamics of module-level snow accumulation and shedding. In an embodiment, higher frequency intervals can add accuracy in some applications. In an embodiment, the time interval may vary, but higher frequency images enable more accurate estimation of power loss. In an embodiment, the time interval may be 5 minutes. Module-level images extracted from the full-field view are binarized into snow and clear areas, allowing for the quantification of percentage snow coverage, estimation of resulting module power output, and temporal changes in snow coverage. The snow shedding power loss data can be used to identify PV system design choices that influence plant performance in snowy conditions.

According to other embodiments of the disclosure, the disclosed systems, methods and tools, in addition to enabling power-loss calculations attributable to partial shading, enable the specific factors that affect snow shedding and snow-related energy losses, such as module architecture and orientation, to be considered during the design phase, resulting in the deployment of higher efficiency systems.

The present invention now will be described more fully hereinafter with reference to the methodology disclosed below, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
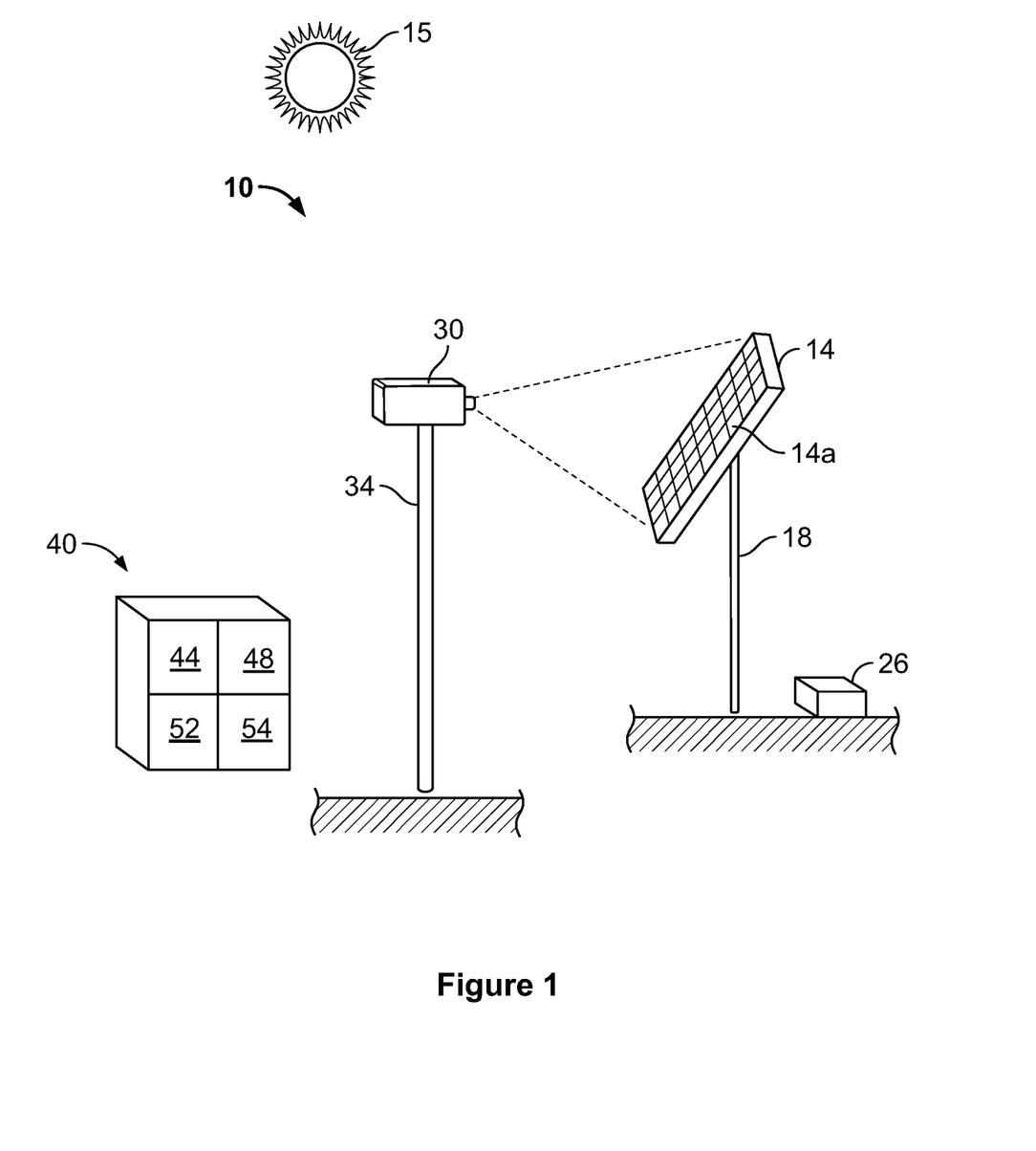
FIG. 1 illustrates a system for estimating photovoltaic module power loss attributable to soiling and/or partial shading according to an embodiment of the disclosure.

FIG. 1 illustrates a system 10 for estimating photovoltaic module power loss attributable to soiling by light-blocking material and/or partial shading. As can be seen in FIG. 1, the system 10 includes a PV module (module) 14 attached to a support 18. The module 14 includes a plurality of PV cells (cells) that are connected in series along with bypass diodes to provide a module power output. In other embodiments, the module 14 may include one or more cells. The PV module receives irradiance from the sun 15. In this exemplary embodiment, the support 18 is a stand, however, in other embodiments, the support 18 may be, but is not limited to a stand, brace, building or other structure to which the module 14 is attached. In other embodiments, the module 14 may include one or more cells. In yet other embodiments, the module 14 may be an array of PV modules. The array is formed of two or more PV modules.

The system 10 further includes a camera 30. In an embodiment, the camera may be a GoPro™ or other camera capable of capturing and storing and/or transmitting image files. The camera 30 is attached to a support 34 that allows the camera 30 to image the front face of the module 14. In this exemplary embodiment, the support 34 is a pole, however, in other embodiments, the support 34 may be, but is not limited to a pole, stand, brace, building or other structure to which the camera 30 is attached allowing unobstructed viewing of the front face of the module 14. It is important to note the camera is not in the path of light from the sun impinging upon the module. In this exemplary embodiment, the camera is shown imaging one module, but in other embodiments, the camera may be imaging one or more (an array) of PVI modules.

The system 10 further includes data collection and storage device 26. In this exemplary embodiment, the device 26 is installed proximate the module 14. In other embodiments, the device 26 may be installed at an off-site location. In an embodiment, the device 26 may be a datalogger. In this exemplary embodiment, the device 26 receives temperature data from the temperature sensor wirelessly. In this exemplary embodiment, the wireless transmission is by WiFi. In other embodiments, the wireless transmission may be by WiFi, Bluetooth™ or other wireless means. In other embodiments, the device may receive data from the temperature sensor by hard wired or wireless connectivity. In an embodiment, the data collection and storage device may collect and/or store data from the camera(s) or other parameter sensing device. In an embodiment, a device, such as but not limited to a Campbell CR-1000, may be used to take temperature data at a predetermined frequency and at a predetermined time span. For example, the data may be collected at a frequency of 1 hour. In another embodiment, data may be collected at a frequency of 15 minutes. In another embodiment, data may be collected every 1 minute. In an embodiment, the data may be collected at a frequency of 15 minutes for 6 months. In another embodiment, data may be collected for 1 year. In another embodiment, data may be collected for one minute and averaged to 15 minute intervals.

The system further includes a data analysis system 40. The data analysis system 40 includes a processor 44, data storage 48, using interface 52 and communications link 54. The data analysis system 40 includes other computer components as known in the art for receiving, analyzing, storing, executing stored commands, displaying and providing a user interface as is known in the art. The storage medium may be RAM, hard drive or the other non-transitory storage medium. The processor 44 is capable of executing commands stored on a computer program product within the memory within the system 40 to determine power loss from light blockage. In other embodiments, the processor 44 may perform additional functions associated with system 10 and system environment, such as, but not limited to weather analysis and power prediction from weather data. In this exemplary embodiment, one data analysis system 40 is used. In other embodiments, one or more data analysis systems may be used either on-site with the system 10 and/or at a remote location.

Methodology

A. Data Collection

Data collection can take place from one PV module or from two or more PV modules to allow for estimation of array-level power loss, or for statistical analysis of the behavior of the array. Data from multiple modules could also be used for comparison of PV modules having differing orientation and/or configuration. For example, rectangular modules may differ from landscape to portrait. In other embodiments, PV modules may differ by surface coating, cell technology, bifaciality, or other parameters and the methodology can be used to contrast/compare those differences.

Cameras are used to collect time-series images of one or more PV modules at a set frequency. The frequency is between 1-15 minutes. In an embodiment, the frequency may be between 5-10 minutes. In yet another embodiment, the image frequency may be 5-minute intervals. According to other embodiments, additional data of interest may be taken that may include back-of-module temperature, ambient temperature, plane-of-array irradiance data, module or array current-voltage measurements, and/or inverter power data. Data collected from the module(s) is then stored and/or transmitted to server. In an embodiment, the collected data may be and stored onsite or transmitted, via cellular modem, hardwire or by otherwise sending the collected data file such as by transporting a hard disc or cd to an offsite server.

A data collection and storage device may be installed proximate the module or at an off-site location. In an embodiment, the data collection and storage device may collect and/or store data from the camera(s), or other parameter sensing devices (e.g., irradiance, temperature, windspeed). In an embodiment, the data collection and storage device may be used to collect temperature data. In an embodiment, a datalogger, such as but not limited to a Campbell CR-1000, may be used to take temperature data at a predetermined frequency and at a predetermined time span. For example, the data may be collected at a frequency matching that of the image collection frequency. In another embodiment, data may be collected at a higher frequency than that of the image data. In another embodiment, data may be collected every 15 seconds. In another embodiment, data may be collected for one minute and averaged.

A data analysis system is used to receive and analyze the module images, temperature measurements and any additional sensed condition of the system and the system environment. For example, system sensed conditions may include, but are not limed to plane-of-array irradiance, module back-side temperature, ambient temperature, windspeed, and module tilt angle. Environmental parameters may include, but are not limited to irradiance temperature, wind speed, (any others) that are provided to the analysis system by appropriate sensor(s) such as, but not limited to temperature sensors, wind speed sensors and the like. The data analysis system can receive data directly from data sources and/or from data collection and storage devices, for example from a datalogger that may perform data analysis.

B. Digital Image Analysis Method

Digital images are processed using extraction and planar indexing of individual modules from point-in-time site images. Extraction and characterization of individual modules, as opposed to array-level analysis, is important for soiling loss evaluation because the power production of a soiled module or array is not directly related to the percent coverage. The series connections of cells and modules, as well as the bypass diodes within a module, mean that power production depends on the specific soiling coverage geometry on a module, as opposed to solely the overall percent coverage on a module or array. Analyzing individual modules in the array, and cell strings in the module, allows for a more accurate estimation of current, power, and energy yield. Module-level images also allow for detailed analysis of light-blocking material and power production as a function of module position within the array.

The soiling loss quantification method is divided into three main steps:

Step 1: Create Time-Series of Images for Each Module.

Stabilization of full-field images: Image registration is used to compensate for camera movement. Selection of unsoiled image: A full-field image is selected without soiling to accurately determine the module positions within the stabilized time series images.

Segmentation of unsoiled image: The image is binarized into module and non-module regions.

Determination of module boundaries: A contour algorithm is used to approximate the edges of the binarized image.

Approximation of contours as quadrilaterals: The contours around each module area are approximated as quadrilaterals to produce the bounding coordinates of each module.

Planar-index transformation: The four corners of each quadrilateral are used to map the module areas from each image in the time-series into an image proportional to the actual module dimensions. This produces a time-series of images for each module.

Step 2: Map Light-Blocking Material Coverage on Each Module Image: Pixels in each module-level image are binarized into light-blocking and unblocked regions using pixel color and other image features, to create a map of coverage on the module surface.

Step 3: Model Power Output

From the time-series of module-level binary light-blocking material coverage maps, percentage coverage of LBM is calculated. Using domain knowledge of the modules' electrical layout, the power output of each string of cells within a module and array as a function of the coverage geometry is modeled. For example, a 60-cell module is typically divided into 3 strings of 20 cells (2 rows of 10 cells), each with its own bypass diode. Because PV cells are connected in series, the current of a cell string is equal to the lowest current produced by any cell. The percent of short circuit current of any given string is equal to the complement of the highest percent coverage for any cell in that string (100-%coverage$_{max}$).

In the module- or array-level current-voltage (I-V) curve, the cell string-level I-V curves are added together in voltage, in order of decreasing short circuit current, where the open circuit voltage of one string is 1/n of the module or array open-circuit voltage and n is the number of cell strings in series. Assuming an equal fill factor for the module-level and string-level I-V curves, the percent power of each string-level I-V curve is proportional to the product of its modeled short circuit current and the fraction of cell strings at or above its short circuit current value. Therefore, the relative power loss of the module or array due to soiling can be estimated by selecting the largest of these approximated local power points and taking its complement (100-% maximum power). To estimate absolute power loss, this relative power loss would be multiplied by the expected power output of the module or array as modeled based on irradiance and weather conditions.

The power loss data of PV modules of various designs and under various operational and environmental conditions can be used to determine various design criteria/parameters and/or operational conditions. For example, the comparison of various coatings on PV modules can be analyzed for power loss under a variety of environmental conditions, such as snow or airborne dust/sand. In other embodiments, the power loss data can be used to analyze power loss due to snow coverage to determine the effects of module type or system design specifications on system performance in snowy regions.

Example—Methodology

A. Data Collection

Collecting time-series images requires installation of a camera capable of capturing images at a set frequency (in this case, the image frequency was set for 5-minute intervals). Other data of interest may include back-of-module temperature, ambient temperature, plane-of-array irradiance data and/or inverter power data. Data was collected and stored onsite or transmitted via cellular modem to an offsite server. This approach allows for regular monitoring of the data to ensure its availability and is thus the preferred approach. The hardware used in this Example is given in Table I.

TABLE I

DATA ACQUISITION SYSTEM FOR EXPERIMENTAL PV SYSTEM IN VERMONT

| Data | Make/Model | Data description |
| --- | --- | --- |
| Digital images | Go-Pro Hero8 | Images collected and stored at an interval of 5 minutes during daylight hours |
| Back-of-module temperature | Omega, Type T | One sensors affixed to each of two designated mid-row modules for each module type |
| Datalogger | Campbell CR-1000 | Data collected at a frequency of 15 secs; averaged per minute |

B. Digital Image Analysis Method is Provided Here:

In this example, digital images were processed using a customized script in the Python programming language v.3.6. The method used extraction and planar indexing of individual modules from point-in-time site images. Extraction and characterization of individual modules, as opposed to array-level analysis, is important for snow loss evaluation because the power production of a snowy array is not directly related to the percent coverage. The series connections of cells and modules, as well as the bypass diodes within a module, mean that power production depends on the specific snow coverage geometry on a module, as opposed to solely the overall percent coverage on an array. Analyzing individual modules in the array, and cell strings in the module, allows for a more accurate estimation of current, power, and energy yield. Module-level images also allow for detailed analysis of light-blocking material and power production as a function of module position within the array.

The snow loss quantification method is divided into three main steps:

Step 1: Create Time-Series of Images for Each Module.

Stabilization of full-field images: Image registration is used to compensate for camera movement. Selection of unsoiled image: A full-field image is selected without soiling to accurately determine the module positions.

Segmentation of unsoiled image: The image is binarized into cell and non-cell regions.

Determination of module boundaries: A contour algorithm is used to approximate the edges of the binarized image.

Approximation of contours as quadrilaterals: Filtering of quadrilaterals based on expected module area.

Planar-index transformation: The four corners of each selected quadrilateral are used to map the module areas from each image in the time-series into an image proportional to the actual module dimensions. This produces a time-series of images for each module.

Step 2: Map Light-Blocking Material Coverage on Each Module Image: Pixels in each module-level image are binarized into light-blocking and unblocked regions using pixel color and other image features, to create a map of coverage on the module surface.

Step 3: Model Power Output

From the time-series of module-level binary light-blocking material coverage maps, we calculate simple percentage coverage of LBM. Using domain knowledge of the modules' electrical layout, we also model the power output of each string of cells within a module, module, and array as a function of the coverage geometry. For example, a 60-cell module is typically divided into 3 strings of 20 cells (each string consisting of 2 rows of 10 cells), with each cell string connected in parallel with its own bypass diode, and in series with the other strings. Because PV cells are connected in series, the current of a cell string is equal to the lowest current produced by any cell. The percent of short circuit current of any given string is equal to the complement of the highest percent coverage for any cell in that string (100-%coverage$_{max}$).

In the module- or array-level current-voltage (I-V) curve, the string-level I-V curves are added together in voltage, in order of decreasing short circuit current, where the open circuit voltage of one string is 1/n of the module or array open-circuit voltage and n is the number of cell strings in series. Assuming an equal fill factor for the module-level and string-level I-V curves, the percent power of each string-level I-V curve is proportional to the product of its modeled short circuit current and the fraction of cell strings at or above its short circuit current value. Therefore, the relative power loss of the module or array due to soiling can be estimated by selecting the largest of these approximated local power points and taking its complement (100-% maximum power). To estimate absolute power loss, this relative power loss would be multiplied by the expected power output of the module or array as modeled based on irradiance and weather conditions.

Example of Snow Coverage and Module Orientation

The following data are from a commercial scale 132 kW PV site in a northern region that provided a near ideal test-bed for measuring the impact of module orientation on power loss due to snow coverage. The site has two adjacent PV systems that feed into the same grid tie: a 58 kW array (190 W poly c-Si modules), arranged in landscape orientation, and a 74 kW system (255 W poly c-Si modules) mounted in portrait orientation. The areas of the modules are 1.49 and 1.63 m$^2$, respectively, and are from different manufacturers, but both types are 60-cell poly c-Si. Both are ground-mount systems, installed at a fixed-tilt angle of 30 degrees.

With permission from the site owner, a monitoring system as described above was used to collect irradiance and back-of-module temperature data; a camera was used to collect visual images of each array at 5-minute intervals.

Figure 2A:
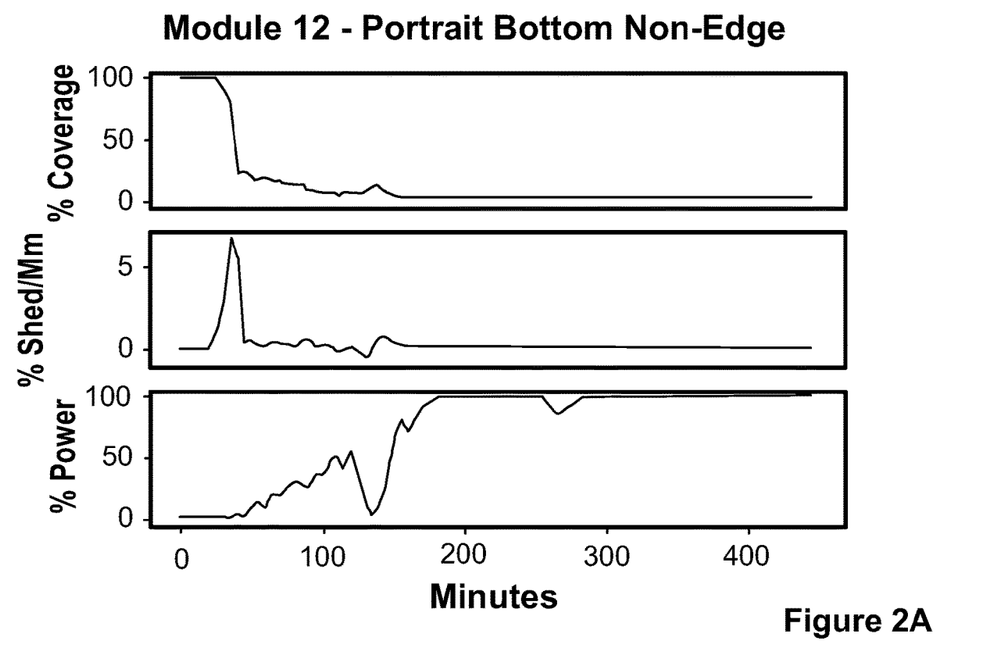
FIG. 2A shows a time series of percent snow coverage, percent snow shed per minute, and modeled percent power as computed using an embodiment of the disclosure for a portrait oriented module.
Figure 2B:
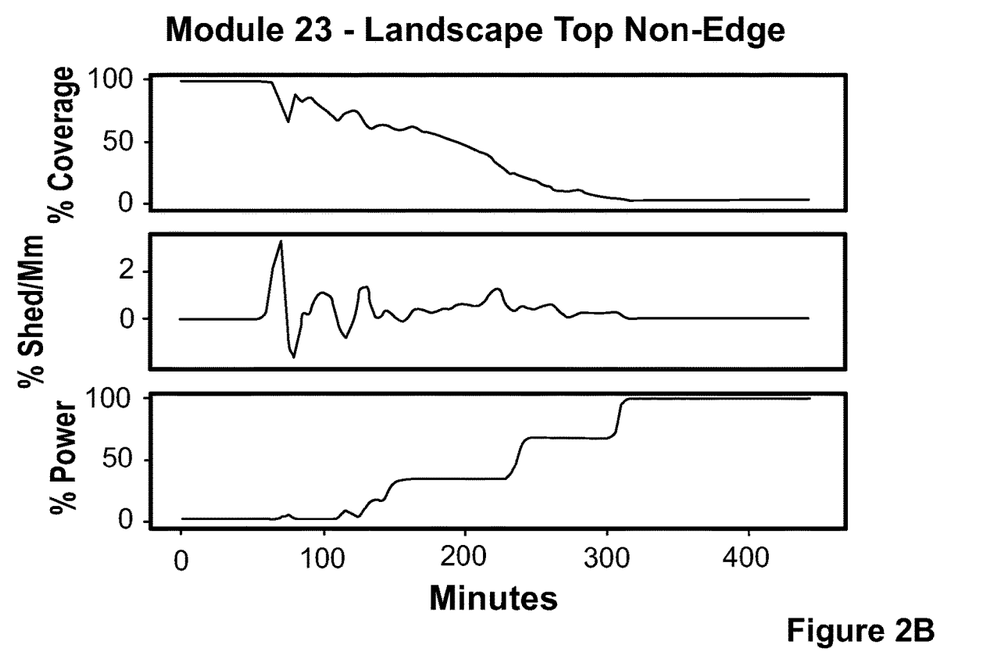
FIG. 2B shows a time series of percent snow coverage, percent snow shed per minute, and modeled percent power as computed using an embodiment of the disclosure for a landscape oriented module.

The camera had a field of view that included four partial rows. Images were processed from the subsequent snow shedding, and the image analysis method was used to segment the landscape and portrait-oriented module images into snow- and non-snow areas. Time-series of snow coverage percentage and modeled power were determined. Time series graphs for one module of each orientation is shown in FIGS. 2A and 2B. FIG. 2A shows a time series of percent snow coverage, percent snow shed per minute, and modeled percent power as computed using an embodiment of the disclosure for a portrait-oriented module. FIG. 2B shows a time series of percent snow coverage, percent snow shed per minute, and modeled percent power as computed using an embodiment of the disclosure for a landscape-oriented module.

Note that the nominal module operating temperature (NMOT) can vary among modules, even of the same brand and model. In this example, the backsheet temperature of 3 modules (2 landscape and 1 portrait) were monitored, along with the ambient temperature, throughout the shedding event. There was no appreciable difference in temperature between the two module types, so temperature data was omitted from further analysis in this example. However, a baseline temperature could be important and may be considered in other applications. From the module time-series images, time scales were quantified related to shedding for each of the two module orientations.

The time series were subset to a 445-minute window around the shedding events for all modules. Sub-setting to common times allows for inter-comparability of the time scales related to snow shedding and power production. The median results for the populations of all extracted portrait and landscape-oriented modules are given in Table II.

TABLE II

MEDIAN PERCENT MAXIMUM ENERGY YIELD AND TEMPORAL SHEDDING METRICS FOR ALL PORTRAIT AND LANDSCAPE ORIENTED MODULES. 445 MINUTE DATA WINDOW BEGINS BEFORE ANY MODULES SHED SNOW, AND ENDS AFTER ALL MODULES HAVE FINISHED SHEDDING.

| Orientation | Energy yield (%) | Time to start shed (min) | Time to produce power (min) | Time to 90% power (min) | Time to finish shed (min) |
|---|---|---|---|---|---|
| Landscape | 59.3 | 47.5 | 65 | 310 | 310 |
| Portrait | 73.5 | 30 | 55 | 185 | 212.5 |

The snow-shedding results show a significant difference in power output between the two module orientations. The landscape orientation modules produced less than 60% of their maximum power during the measurement window, while the portrait orientation module produced 73.5%. This implies that a system would produce nearly 1.5 kWh/kW$_P$ more for this event if the modules were oriented in portrait orientation versus landscape. Moreover, landscape-oriented modules began shedding 7.5 minutes later, began producing power 10 minutes later, and reached 90% and full power 125 and 97.5 minutes later than portrait-oriented modules.

Those calculations, however, can be further refined based on a module's position in an array. Modules at the edge of an array may be more susceptible to mini-climatic effects such as wind and ambient temperature differences, and also have fewer physical impediments to shedding, as they are not surrounded on all sides by other modules. The modules' positions were considered in gathering the metrics in Table III. The vertical position of the module as well (top, middle, or bottom row) were included because snow shedding from higher modules onto lower ones, and adjacent modules acting as impediments, also affect shedding.

TABLE III

MEDIAN PERCENT MAXIMUM ENERGY YIELD AND TEMPORAL SHEDDING METRICS FOR PORTRAIT AND LANDSCAPE ORIENTED MODULES SORTED BY MODULE POSITION THROUGH A 445 MINUTE DATA WINDOW.

| Orientation | Position | Edge | Energy yield (%) | Time to start shed (min) | Time to produce power (min) | Time to 90% power (min) | Time to finish shed (min) |
|---|---|---|---|---|---|---|---|
| Portrait | Top | Edge | 80.2 | 25 | 72.5 | 97.5 | 125 |
| Portrait | Bottom | Edge | 74.7 | 25 | 35 | 230 | 240 |
| Portrait | Top | Non-Edge | 64.7 | 30 | 115 | 185 | 225 |
| Portrait | Bottom | Non-Edge | 72.8 | 30 | 37.5 | 182.5 | 230 |
| Landscape | Top | Edge | 54.8 | 45 | 70 | 275 | 280 |
| Landscape | Middle | Edge | 60.5 | 45 | 45 | 285 | 285 |
| Landscape | Bottom | Edge | 66.0 | 45 | 55 | 285 | 290 |
| Landscape | Top | Non-Edge | 55.0 | 57.5 | 72.5 | 310 | 310 |
| Landscape | Middle | Non-Edge | 54.1 | 37.5 | 65 | 357.5 | 357.5 |
| Landscape | Bottom | Non-Edge | 68.1 | 55 | 65 | 330 | 335 |

As shown in Table III, the portrait-oriented modules outperformed their landscape counterparts in energy yield for all corresponding positions in the array. The reason is that all portrait-oriented modules, regardless of location, start and finish snow shedding before the landscape-oriented modules.

What is most interesting, however, is that module position—not orientation—was the biggest factor in the start of power generation. While the portrait modules on the bottom of the array were the first to produce power, the portrait modules at the top of the array were the last. Similarly, landscape modules on the top row were the last of their orientation to produce power. For both orientations, the top row of modules began shedding snow and producing power later than their counterparts. Additionally, the top row of portrait modules was the last to produce power, but the first to reach full power. Our time-series images explain why.

Portrait- and landscape-oriented modules on the bottom row tended to shed snow in a few large sheets, clearing themselves earlier than other modules. However, top-row modules shed snow more slowly as a sheet, with pieces occasionally breaking off and traversing the lower modules. These pieces would cause shading and sometimes stick to the lower modules until melting. As a result, the bottom row of modules had an overall higher energy yield, despite completing shedding after the upper modules were clear.

The impact of shedding behavior on power production reflects the internal electrical circuitry of the modules. The modeled power for a portrait-oriented module, for example, would remain zero until less than one full cell width along the bottom of the module was covered with snow. In contrast, landscape-oriented modules on the top row experiencing the same shedding mechanism and rate would produce energy much earlier, as the snow would allow for cell-level strings to begin producing power as the snow moved vertically down the module.

In analyzing images as described above, numerous errors in either snow coverage or modeled power can arise that may be considered in the methodology. The angle of the camera relative to the module area affects not only the perceived coverage of the module, but also the hue of the shaded vertical faces of deep snow as pieces of the sheet break off and shed. These factors affect the accuracy of the snow detection as they can cause clear areas to be classified as snowy, and vice versa. Module or array movement (as a result of wind loading or changes in weight distribution from snow loading or shedding) is a similar source of error that may also be quantified and analyzed. While images can be stabilized for camera movement, movement of the arrays cannot be corrected but may be taken as an additional parameter for analysis. As some of these modules are mounted on variable angle racking, shedding of large amounts of snow results in a slight change in the array angle. This causes the module frame to be included in the extracted image. Because the frame is lightly colored, the segmentation step may classify the frame area as snow, which decreases the modeled power. These errors can be decreased, however, by choosing a camera angle near normal to the face of the modules or by including contributing parameters in the analysis.

The above measurement methodology can be applied broadly to multiple PV sites and technologies to capture data on power losses attributable to snow as well as LBM (e.g., dust, sand, pollen, ash). In addition to modifying the camera setup to improve image quality and reduce the analysis errors described above, temperature, irradiance, and inverter or micro-inverter data may be incorporated to improve shedding quantification and energy yield validation. When considering systems with different nominal module operating temperatures (NMOTs) or different locations, module and ambient temperature data may be used to normalize shedding statistics. Module temperature and plane-of-array irradiance data may also be used to improve on our power prediction model, which can be validated with module or array-level inverter data.

The results above suggest that 1) module orientation is a significant factor in snow losses and 2) the snow losses attributable to orientation are quantifiable and can be modeled based on module design, system design, and meteorological data. The Example demonstrates not only that one can quantify snow losses based on image analysis, but the interplay of snow shedding and coverage mapping is an important factor in accurately estimating power losses for the design of high-efficiency PV systems in regions with high instances of light-blocking material.

As proof of concept, preliminary data from one site indicate that framed modules in portrait orientation outperform their framed counterparts in landscape orientation by as much as 24% energy yield during a single snow-shedding event (See Example below). While these data reflect a single event, and do not capture snow shedding behavior across diverse temperature and other climatic conditions, the example nonetheless demonstrated that 1) module orientation and position in the array influence shedding patterns; 2) the start of power production and bypass diode activation differ for portrait and landscape module orientations at similar percentages and orientations of snow coverage; and 3) system design is an important factor in snow.

In an example discussed below, a case study of module orientation, using time-series of images collected at 5-minute intervals, is used to compare various metrics for snow shedding and energy yield from modules in landscape and portrait orientations.

As discussed above, a method for quantifying light-blocking material, such as snow coverage of PV modules and modeling the corresponding loss of module power, and temporal metrics for comparing shedding rates of LBM between modules and systems can be used to quantify the susceptibility of various photovoltaic module technologies and system designs to power loss due to light-blocking material. Being able to quantify the impact of module and system design choices on energy losses has significant value to a broad community of manufacturers, asset owners, investors, etc. The methodology provides a technical rationale for establishing a set of design recommendations/standards that recognize climate-specific performance challenges and also provide a techno-economic basis for mitigation strategies, such as cleaning or applying anti-soiling coatings.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for detecting and quantifying light-blocking material (LBM) or partial shading on one or more photovoltaic (PV) modules and determining a corresponding loss of module power, comprising the following steps:
   Step 1: Create Time-Series of Images for Each Module;
   Step 2: Map LBM or Shading Coverage on Each Module Image;
   Step 3: Create a Model of Power Output of the one or more PV modules;
   Step 4: Quantify Power Loss of the one or more PV modules by executing the Model of Power Output; and
   Step 5: Use Quantified Power Loss to determine the one or more PV modules operational parameters.

2. The method of claim 1, wherein the one or more PV modules is one PV module and the loss of corresponding power is for the one PV module.

3. The method of claim 1, wherein the one or more PV modules is two or more PV modules forming an array and the loss of corresponding power is for the individual modules and/or array.

4. The method of claim 1, further comprising:
   generating temporal metrics for comparing shedding rates of light-blocking material from the one or more modules.

5. The method of claim 1, wherein Step 1: Create Time-Series of Images for Each Module, comprises the following steps:
   a) stabilization of full-field images to compensate for camera movement;
   b) selection of unsoiled image to accurately determine the module positions;
   c) segmentation of unsoiled image by binarizing the image into module and non-module regions;
   d) determining module boundaries by using a contour algorithm to approximate the edges of the module(s) in the binarized image;
   e) approximating contours as quadrilaterals to produce the bounding coordinates of each module of the one or more modules and filtering the quadrilaterals based on expected module area; and
   f) performing planar-index transformation: The four corners of each selected quadrilateral are by using the four corners of each selected quadrilateral to map each module area of one or more modules from each image in the time-series into an image proportional to the actual module dimensions to produce a time-series of images for each module of the one or more modules.

6. The method of claim 1, wherein Step 2: Map LBM Coverage on Each Module Image, comprises:
   binarizing pixels in each module-level image into light-blocking/shaded and unblocked/unshaded regions using pixel color and other image features to create a map of coverage on the module surface.

7. The method of claim 1, wherein Step 3: Model Power Output, comprises:
   using photovoltaic performance models to estimate power for an unshaded module or modules based on measured irradiance, temperature and weather conditions corresponding to the image timeseries.

8. The method of claim 1, wherein Step 4: Quantify Power Loss, comprises:
   estimating actual power from a partially soiled or shaded module or array by modeling the power output of each string, module, and array as a function of the coverage geometry using domain knowledge of the modules' electrical layout; and
   adding the string-level I-V curves in voltage in order of decreasing short circuit current, wherein open circuit voltage of one string is 1/n of the module or array open-circuit voltage and n is the number of cell strings in series; and
   using the resulting modeled string-level I-V curve to find the global maximum operating power point for the module; and
   scaling the resulting power estimate by the modeled power for the equivalent unshaded array.

9. The method of claim 1, wherein Step 5: Use Quantified Power Loss to determine one or more module or array physical or operational parameters, comprises:
   comparing quantified power loss and/or estimated power output between partially shaded/soiled modules or arrays, or between modules or arrays and other performance or soiling modules, to determine the influence of various module, array, or operational parameters on the shading, soiling, or performance properties of the module or array.

10. The method of claim 1, wherein Step 5: Use Quantified Power Loss to determine one or more module or array physical or operational parameters, comprises:
determining the influence of PV module tilt angle on snow shedding and power loss.

11. The method of claim 1, wherein Step 5: Use Quantified Power Loss to determine one or more module or array physical or operational parameters, comprises:
determining the influence of PV module orientation of landscape or portrait on snow shedding and power loss.

12. The method of claim 1, wherein Step 5: Use Quantified Power Loss to determine one or more module or array physical or operational parameters, comprises:
determining the influence of PV module bifaciality on snow shedding and power loss.

13. The method of claim 1, wherein Step 5: Use Quantified Power Loss to determine one or more module or array physical or operational parameters, comprises:
determining the influence of PV module surface coatings on snow shedding and power loss.

14. The method of claim 1, wherein Step 5: Use Quantified Power Loss to determine one or more module or array physical or operational parameters, comprises:
determining the influence of PV module surface coatings on soiling and power loss.

15. The method of claim 1, wherein Step 5: Use Quantified Power Loss to determine one or more module or array physical or operational parameters, comprises:
determining the influence of PV module operating point on snow shedding and power loss.

16. The method of claim 1, wherein Step 5: Use Quantified Power Loss to determine one or more module or array physical or operational parameters, comprises:
determining the influence of the presence or geometry of a PV module frame on snow shedding and power loss.

17. A system for detecting and quantifying light-blocking material (LBM) or shading on one or more photovoltaic (PV) modules and determining a corresponding loss of module power, comprising:
the one or more PV modules having a surface that received solar irradiance;
a camera for imaging the surface to create surface images;
a computer that receives the surface images and that is configured to execute commands stored on a non-transitory medium, the commands comprising the following steps:
Step 1: Create Time-Series of the Images for Each Module of the One or More Modules;
Step 2: Map LBM Coverage on Each Module Image;
Step 3: create a Model of Power Output of the one or more PV modules;
Step 4: Quantify Power Loss of the one or more PV modules; and
Step 5: Use Quantified Power Loss to determine the influence of the one or more PV modules on module or array performance under partial shading, soiling, or other coverage.

18. The system of claim 17, wherein the one or more PV modules is one PV module and the loss of corresponding power is for the one PV module.

19. The system of claim 17, wherein the one or more PV modules is two or more PV modules forming an array and the loss of corresponding power is for the individual modules and/or array.

20. The system of claim 17, further comprising:
generating temporal metrics for comparing shedding rates of light-blocking material from the one or more modules.

21. The system of claim 17, wherein Step 1: create time-series of images for each module, comprises the following steps:
g) stabilization of full-field images to compensate for camera movement;
h) selection of unsoiled image to accurately determine the module positions;
i) segmentation of unsoiled image by binarizing the image into cell and non-cell regions;
j) determining module boundaries by using a contour algorithm to approximate the edges of the binarized image;
k) approximating contours as quadrilaterals to produce the bounding coordinates of each module of the one or more modules and filtering the quadrilaterals based on expected module area; and
l) performing planar-index transformation: The four corners of each selected quadrilateral are by using the four corners of each selected quadrilateral to map each module area of one or more modules from each image in the time-series into an image proportional to the actual module dimensions to produce a time-series of images for each module of the one or more modules.

22. The system of claim 17, wherein Step 2: Map LBM Coverage on Each Module Image, comprises:
binarizing pixels in each module-level image into light-blocking and unblocked regions using pixel color and other image features to create a map of coverage on the module surface.

23. The system of claim 17, wherein Step 3: Model Power Output, comprises:
calculating simple percentage coverage of LBM from the time-series of module-level binary LBM coverage maps;
modeling the power output of each string, module, and array as a function of the coverage geometry using domain knowledge of the modules' electrical layout;
adding the string-level I-V curves in voltage in order of decreasing short circuit current, wherein open circuit voltage of one string is 1/n of the module or array open-circuit voltage and n is the number of cell strings in series.

24. The system of claim 17, wherein Step 4: Quantify Power Loss, comprises:
scaling the modeled power output by the quantified power loss to estimate actual power from a partially soiled or shaded module or array by modeling the power output of each string, module, and array as a function of the coverage geometry using domain knowledge of the modules' electrical layout; and
adding the string-level I-V curves in voltage in order of decreasing short circuit current, wherein open circuit voltage of one string is 1/n of the module or array open-circuit voltage and n is the number of cell strings in series; and
using the resulting modeled string-level I-V curve to find the global maximum operating power point for the module(s); and
scaling the resulting power estimate by the modeled power for the equivalent unshaded array.

25. The system of claim 17, wherein Step 5: Use Quantified Power Loss to determine one or more module or array physical or operational parameters, comprises:

comparing quantified power loss and/or estimated power output between partially shaded/soiled modules or arrays, or between modules or arrays and other performance or soiling modules, to determine the influence of various module, array, or operational parameters on the shading, soiling, or performance properties of the module or array.

26. The system of claim 17, wherein Step 5: Use Quantified Power Loss to determine one or more module or array physical or operational parameters, comprises:
   determining the influence of PV module tilt angle on snow shedding and power loss.

27. The system of claim 17, wherein Step 5: Use Quantified Power Loss to determine one or more module or array physical or operational parameters, comprises:
   determining the influence of PV module orientation of landscape or portrait on snow shedding and power loss.

28. The system of claim 17, wherein Step 5: Use Quantified Power Loss to Determine one or more module or array physical or operational parameters, comprises:
   determining the influence of PV module bifaciality on snow shedding and power loss.

29. The system of claim 17, wherein Step 5: Use Quantified Power Loss to determine one or more module or array physical or operational parameters, comprises:
   determining the influence of PV module surface coatings on snow shedding and power loss.

30. The system of claim 17, wherein Step 5: Use Quantified Power Loss to determine one or more module or array physical or operational parameters, comprises:
   determining the influence of PV module surface coatings on soiling and power loss.

31. The system of claim 17, wherein Step 5: Use Quantified Power Loss to determine one or more module or array physical or operational parameters, comprises:
   determining the influence of PV module operating point on snow shedding and power loss.

32. The system of claim 17, wherein Step 5: Use Quantified Power Loss to determine one or more module or array physical or operational parameters, comprises:
   determining the influence of the presence or geometry of a PV module frame on snow shedding and power loss.

\* \* \* \* \*